(12) United States Patent
La Barre

(10) Patent No.: US 6,221,449 B1
(45) Date of Patent: Apr. 24, 2001

(54) PREFORM FOR PRODUCING CONTAINERS WITH AN INNER PARTITION FROM A THERMOPLASTIC MATERIAL

(75) Inventor: Paul La Barre, Sainte Adresse (FR)

(73) Assignee: Sidel S.A., Octeville sur Mer (FR)

( * ) Notice: Subject to any disclaimer, the term of this patent is extended or adjusted under 35 U.S.C. 154(b) by 0 days.

(21) Appl. No.: 09/077,742

(22) PCT Filed: Dec. 11, 1996

(86) PCT No.: PCT/FR96/01982

§ 371 Date: Nov. 4, 1998

§ 102(e) Date: Nov. 4, 1998

(87) PCT Pub. No.: WO97/21533

PCT Pub. Date: Jun. 19, 1997

(30) Foreign Application Priority Data

Dec. 11, 1996 (FR) .................................. 95 14707

(51) Int. Cl.$^7$ ................ B29C 49/22; B65D 1/04
(52) U.S. Cl. .............. 428/35.7; 428/36.9; 428/524.8; 220/507; 220/555; 215/6; 264/532
(58) Field of Search ................ 428/524.8, 36.9, 428/36.91, 36.7, 36.6, 35.7; 220/507, 555; 215/6; 264/532

(56) References Cited

U.S. PATENT DOCUMENTS

| | | | | |
|---|---|---|---|---|
| 3,052,368 | * | 9/1962 | Atkins et al. ............ | 220/555 |
| 5,232,108 | * | 8/1993 | Nakamura ............... | 215/6 |
| 5,269,441 | * | 12/1993 | O'Meara ................. | 215/6 |
| 5,482,170 | * | 1/1996 | Semersky et al. ........ | 215/6 |
| 5,529,195 | * | 6/1996 | Valyi ...................... | 215/6 |
| 5,579,937 | * | 12/1996 | Valyi ...................... | 215/6 |
| 5,788,794 | * | 8/1998 | Valyi ...................... | 215/6 |
| 5,837,170 | * | 11/1998 | Valyi ...................... | 215/6 |
| 5,849,241 | * | 12/1998 | Connan ................... | 215/6 |

FOREIGN PATENT DOCUMENTS 531 536 * 3/1993 (EP) .
WO 90/05674 * 5/1990 (WO) .

* cited by examiner

*Primary Examiner*—Rena L. Dye
(74) *Attorney, Agent, or Firm*—Sughrue, Mion, Zinn, Macpeak & Seas, PLLC

(57) ABSTRACT

A preform (9) made of thermoplastic material and including a body (11) provided with an at least partially longitudinally extending inner partition (10). The preform is used for molding and particularly blow molding or stretch-blow molding a container with a body having opposed portions defining hollow recesses with inwardly-directed convex surfaces, said portions being spaced apart by said inner partition. In a straight cross-sectional view, the body (11) has a non-circular outline with two opposed portions (a, b) separated by a minimum distance ($d_1$) that is smaller than the distances between the other pairs of opposed portions of said outline. The inner partition (10) extends between said two opposed portions (a, b), and said distance ($d_1$) is such that, relative to the periphery of the body (11) of the preform, during molding, the inner partition (10) is transversely stretched at a rate equal to that at which the body (11) is transversely or peripherally stretched.

10 Claims, 3 Drawing Sheets

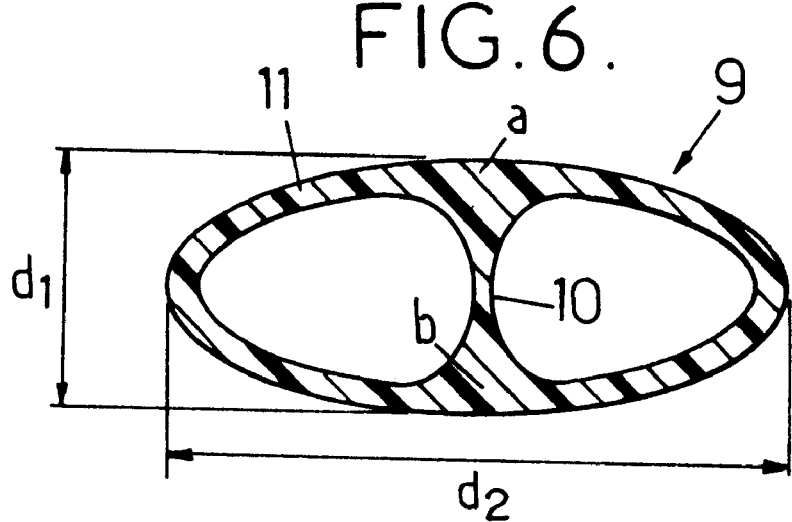
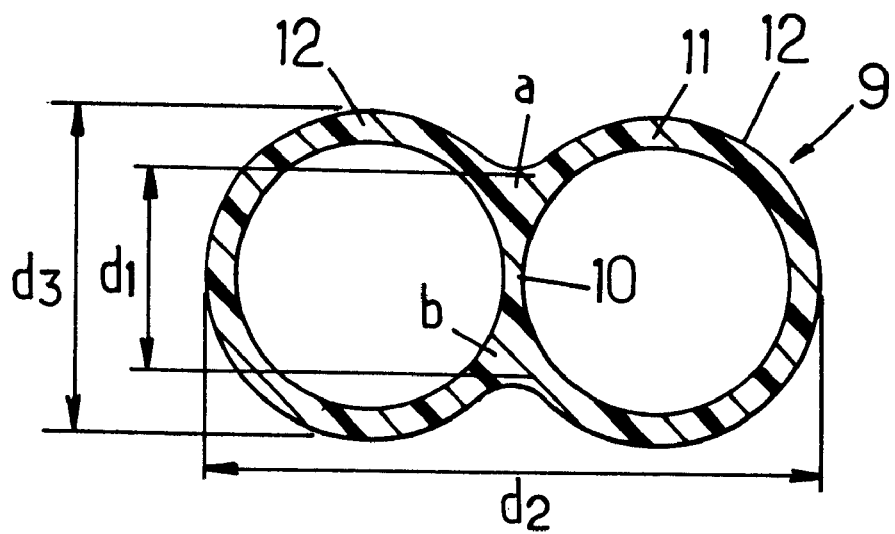

PREFORM FOR PRODUCING CONTAINERS WITH AN INNER PARTITION FROM A THERMOPLASTIC MATERIAL

FIELD OF THE INVENTION

The present invention relates to improvements made to preforms made of thermoplastic, having a body provided with an at least partially longitudinally extended internal partition and intended for the manufacture, by molding, especially by blow molding or by stretch-blow molding, of a container whose body has opposed portions forming hollow recesses with inwardly directed convex surfaces, said recesses being braced by said internal partition.

BACKGROUND OF THE INVENTION

It is known to provide containers, especially bottles, made of a thermoplastic such as polyethylene terephthalate PET, polyethylene naphthalate PEN, or another thermoplastic, with an internal partition. Such a partition may be complete, i.e. it may extend over the entire height of the container, in order to divide the internal volume of the container into two chambers containing two respective liquids which must not be mixed together before being poured. As shown in FIG. 1 of the appended drawing, the partition 1 may also be partial, i.e. it may extend only over part of the length of the body 2 of the container 3, in order to retain (bracing) two opposed portions of the body of the container, for example in order to maintain two gripping recesses 4 hollowed out in the body of a container filled with a pressurized liquid, which recesses, even if they were not reinforced, would risk being deformed due to the effect of the pressure of the liquid.

It is known to manufacture such containers from preforms which themselves are provided with a totally or partially longitudinally extended internal partition depending on the type of final container to be obtained. Such a preform 5 with a partially longitudinally extended internal partition 6, intended for the manufacture of the container in FIG. 1, is illustrated in FIGS. 2 and 3 of the appended drawing, respectively as a side view in FIG. 2 and, in the case of FIG. 3, in a cross-sectional top view on the line II—II of FIG. 2. It has a general structure similar to that of a partitionless preform with a neck 7 and a thick-walled body 8 which are conventionally shaped. The internal partition 6 has a thickness appreciably smaller than that of the thick wall of the body.

When this known preform, after it has been heated, is subjected to a stretching or stretch-blowing process in order to obtain a container, the internal partition stretches, as does the wall of the body: the longitudinal stretch ratio of the partition is identical to that undergone by the body (for example, in order to be specific, typically 2.22 to 3.5 for the PET grades currently used on an industrial scale). On the other hand, when the body of the container to be obtained has to have a localized transverse necking—for example distance between the bottom of the gripping recesses 4 of the container of FIG. 1—, the transverse stretch ratio of the partition is locally very much less than the transverse (or perimetric) stretch ratio of the body of the container: in order to be specific, the transverse or perimetric stretch ratio of the body is generally at least about 4, while the transverse stretch ratio undergone by the partition remains here less than 4.

As a result, there is a disadvantageous difference between the properties of the material of the partition and of the material of the body of the container: since its material has not undergone sufficient transverse elongation, in order to orient the molecular chains in a complementary fashion the partition is subject to deformation when the container is subsequently exposed to severe conditions of use and the partition is no longer capable of effectively ensuring its bracing function.

BRIEF DESCRIPTION OF THE DRAWINGS

FIGS. 6 and 7 are cross-sectional views of preforms in accordance with the present invention having their respective partitions joined by rounded parts of relatively large radius.

DETAILED DESCRIPTION OF THE INVENTION

The object of the invention is specifically to remedy this drawback and to provide a technical solution which allows, during the blowing or stretch-blowing process, a transverse elongation ratio substantially identical for the body of the preform and for the internal partition so that the constituent materials of each of them have appreciably similar physical and mechanical properties and behave in a homogeneous fashion.

Figure 1:
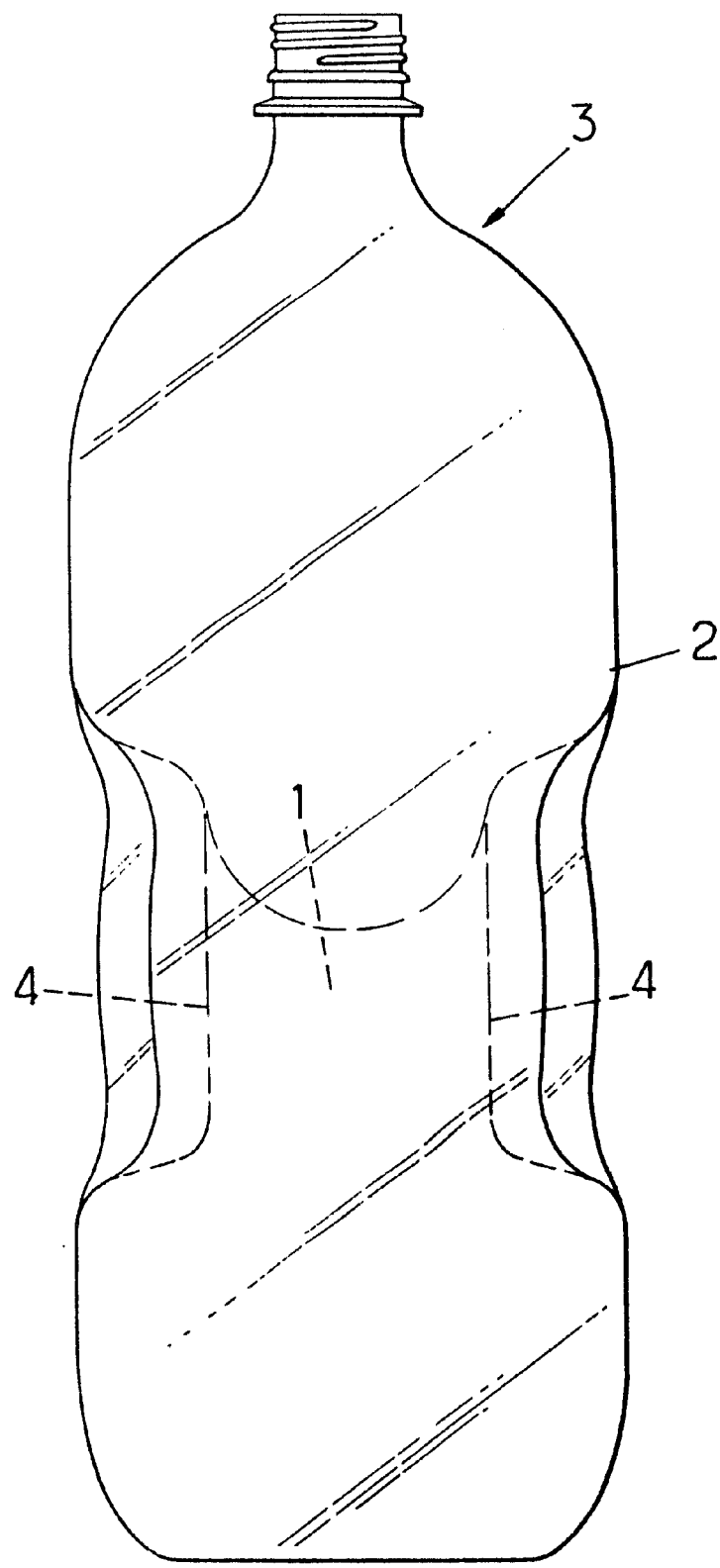
FIG. 1 is a drawing of a container having a partition formed therein for maintaining gripping recesses.
Figure 2:
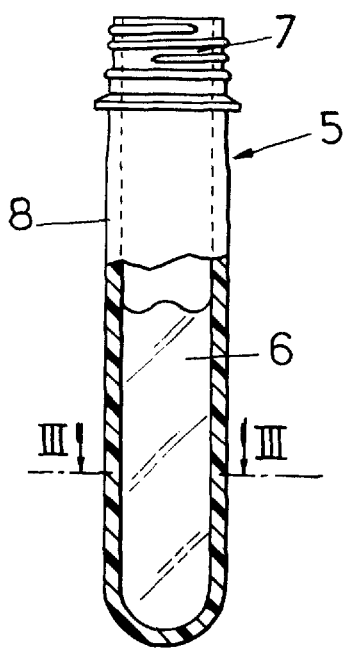
FIG. 2 is a drawing of a preform for the container of FIG. 1 with a partial section view of the longitudinally extended internal partition.
Figure 4:
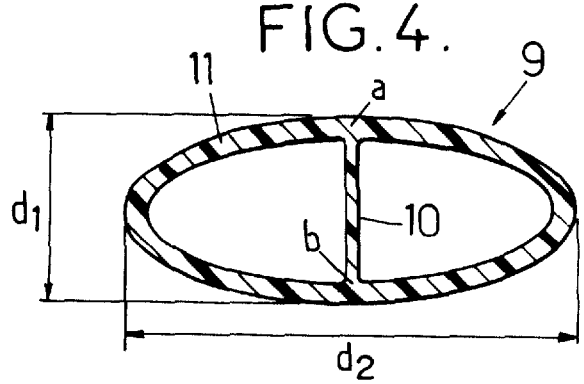
FIGS. 4 and 5 are cross-sectional views of preforms in accordance with the present invention.
Figure 3:
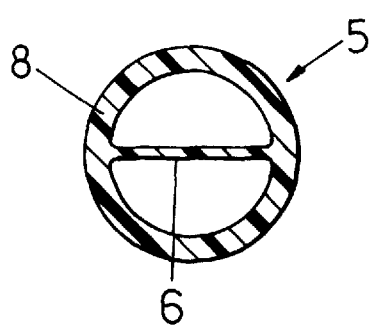
FIG. 3 is a cross-sectional view of the preform shown in FIG. 2 along the line III-III.
Figure 5:
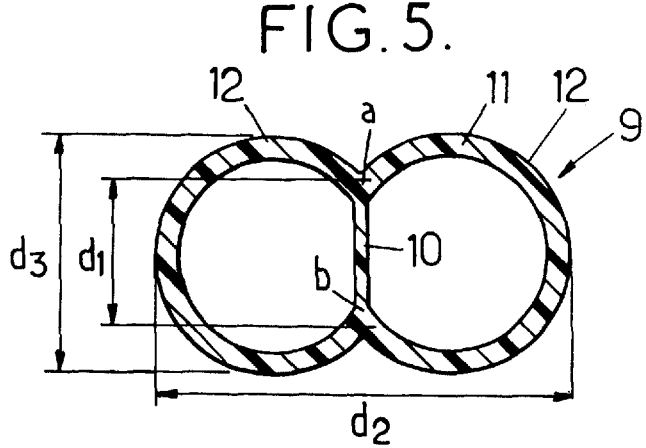

To these ends, and with reference to FIGS. 4 and 5 of the appended drawing illustrating, respectively, in a cross-sectional top view and on an appreciably greater scale than that in FIG. 3, two possible embodiments of a preform according to the invention which are given by way of non-limiting examples, a preform 9 as indicated in the preamble is essentially characterized, being designed in accordance with the invention, in that its body 11 has, in cross section, a noncircular outline with two opposed portions a and b separated from each other by a minimum distance $d_1$ which is less than the distances separating the other pairwise opposed portions of said outline, in that the internal partition 10 extends between said two opposed portions a, b separated by a minimum distance $d_1$ and in that said minimum distance $d_1$ is chosen, with respect to the perimeter of the body 11 of the preform, such that, during molding, the internal partition 10 undergoes a transverse stretch ratio which has approximately the same value as the transverse (or perimetric) stretch ratio undergone by the body.

Moreover, because of the fact that the correct execution of the blow-molding or stretch-blow molding process virtually excludes the use of preforms having a body of geometrically too complex shape, a preform 9 will advantageously be used whose body 11 has a maximum transverse dimension $d_3$, regarded as being parallel to the internal partition 10, which is appreciably less than its maximum transverse dimension $d_2$, regarded as being approximately perpendicular to the internal partition 10, the ratio of said transverse dimensions $d_3$ and $d_2$ then being such that, during molding, the internal partition 10 undergoes a transverse stretch ratio which is approximately identical to the transverse stretch ratio undergone by the body.

Although other arrangements may in principle be envisaged, it is, however, simpler and, for most practical applications, sufficient for the partition 10 to extend centrally in a plane of symmetry of the body 11.

It is desirable for the use of preforms according to the invention to involve only minimal adaptations of plants for manufacturing containers in order to obtain final containers of given shapes and properties (dimensions, thickness of the walls, thermal resistance, etc.). However, the various ways of implementing the manufacturing process and said properties of the final containers are dependent on the properties of the starting preform, and in particular on the geometrical dimensions of its body (perimeter, wall thickness, etc.). Thus, a minimal modification of the manufacturing conditions and of the manufacturing plants in order to achieve a given container means that the preform according to the invention preserves the fundamental properties of the prior preforms for the use of which the current manufacturing plants are designed. The same applies in particular to the perimeter of the body.

It is therefore desirable in practice, whatever the geometrical shape given to the body of the preform, for the perimeter of the cross section of said body 11, at least in that part of the latter which is provided with an internal partition, to maintain a value approximately similar to that of the perimeter of the cylindrical body of revolution 8 of the conventional preform, while the internal partition 10 is, in accordance with the abovementioned arrangements of the invention, narrower than the partition 6 of the prior preforms.

Having established this, the body 11 of the preform 9 designed according to the invention may be given any shape complying with this basic condition. In particular, the body may be cylindrical, especially with a cross section of oval or elliptical shape, as shown in FIG. 4; the two aforementioned portions a and b are then the parts of largest radius of curvature and the internal partition 10 extends along the minor axis of the oval or of the ellipse, the aforementioned distances $d_1$ and $d_3$ then being identical. It is also possible to provide, as shown in FIG. 5, a body having a bilobate outline, the partition 10 extending between the two lobes 12; here, the aforementioned portions a and b are angular parts joining the two lobes together.

In order to facilitate the stretching process and to reinforce the container, it is desirable for the partition 10 to be joined to the wall of the preform by rounded parts of relatively large radius, as shown in FIGS. 6 and 7 which correspond respectively to FIGS. 4 and 5.

In the same way as for the prior preforms, the internal partition may have a total or partial longitudinal extent with respect to the body of the preform. In the case of a partial partition, provision may optionally be made for the particular shape given to the body 11 of the preform according to the invention to extend longitudinally only in correspondence with the partition and, in the case of the rest of its longitudinal extent, for the body to be a cylinder of revolution, as in the case of a conventional preform.

By virtue of the arrangements adopted in accordance with the invention, an improved preform is produced which is capable of leading to a final container having an internal partition which has uniform properties and which is capable of withstanding, during use, thermal and/or mechanical stresses without thereby resulting in appreciable deformation of the overall body, including deformation of the portions of the latter which previously were subject to being deformed due to the effect of the pressure of a pressurized filling liquid and which are now correctly retained by the correctly stretched partition which appropriately fulfills its bracing function.

As goes without saying and as has already resulted from the foregoing, the invention is in no way limited to those of its modes of application and of its embodiments which have been more particularly envisaged; on the contrary, it encompasses all variants thereof.

What is claimed is:

1. A thermoplastic preform, having a body provided with an at least partially longitudinally extended internal partition and intended for the manufacture, by molding, of a container whose body has opposed portions forming hollow recesses with inwardly-directed concave surfaces, said recesses being braced by said internal partition, wherein the body of the preform has, in cross section, an outline of noncircular shape with two opposed portions (a, b) separated from each other by a minimum distance ($d_1$) less than the distances separating the other pairwise opposed portions of said outline, wherein the internal partition extends between said two opposed portions (a, b) separated by a minimum distance ($d_1$), and wherein said minimum distance ($d_1$) is chosen, with respect to the perimeter of the body of the preform, so that, during molding, the internal partition undergoes a transverse stretch ratio which has approximately the same value as the transverse or perimetric stretch ratio undergone by the body.

2. Preform according to claim 1, wherein the body has a maximum transverse dimension ($d_3$), regarded as being parallel to the internal partition, which is appreciably less than the maximum transverse dimension ($d_2$), regarded as being approximately perpendicular to the internal partition, the ratio of said transverse dimensions ($d_3$, $d_2$) being such that, during molding, the internal partition undergoes a transverse stretch ratio which is approximately identical to the transverse stretch ratio undergone by the body.

3. Preform according to claim 1, wherein the internal partition extends centrally in a plane of symmetry of the body.

4. Preform according to claim 1, wherein at least in its part in correspondence with the internal partition, the body has a cylindrical contour.

5. Preform according to claim 3, wherein the cross section of the body is approximately oval or elliptical, with the internal partition extending approximately along the minor axis of the oval or of the ellipse.

6. Preform according to claim 1, wherein the body has a bilobate outline, the internal partition extending between the two lobes.

7. Preform according to claim 1, wherein the internal partition extends over the entire length of the body.

8. Preform according to claim 1, wherein the internal partition extends only over part of the length of the body, and in its part not provided with an internal partition, the body is a cylinder of revolution.

9. Preform according to claim 1, wherein said molding is blow molding.

10. Preform according to claim 1, wherein said molding is stretch-blow molding.

* * * * *